US012230035B2

(12) United States Patent
Daudelin et al.

(10) Patent No.: US 12,230,035 B2
(45) Date of Patent: Feb. 18, 2025

(54) SYSTEMS AND METHODS FOR DETECTING A REFLECTION ARTIFACT IN A POINT CLOUD

(71) Applicant: Toyota Research Institute, Inc., Los Altos, CA (US)

(72) Inventors: Jonathan A. Daudelin, Ann Arbor, MI (US); Jacopo Serafin, Dexter, MI (US); Sachithra Hemachandra, Sunnyvale, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 330 days.

(21) Appl. No.: 17/731,828

(22) Filed: Apr. 28, 2022

(65) Prior Publication Data
US 2023/0351765 A1    Nov. 2, 2023

(51) Int. Cl.
*G06V 20/58*     (2022.01)
*G06T 7/536*     (2017.01)

(52) U.S. Cl.
CPC .............. *G06V 20/58* (2022.01); *G06T 7/536* (2017.01); *G06T 2207/10028* (2013.01)

(58) Field of Classification Search
None
See application file for complete search history.

(56) References Cited

U.S. PATENT DOCUMENTS

| 10,109,208 | B2 | 10/2018 | Cherepinsky et al. |
| 10,908,268 | B2 | 2/2021 | Zhou et al. |
| 11,041,957 | B2 | 6/2021 | Uehara |
| 11,851,083 | B2 * | 12/2023 | Hartnett ................. G06V 20/56 |
| 2019/0082098 | A1 * | 3/2019 | Costa ..................... H04N 23/54 |
| 2023/0041031 | A1 * | 2/2023 | Baldan ................ B60W 60/001 |
| 2023/0351765 | A1 * | 11/2023 | Daudelin .............. G06T 7/0002 |

OTHER PUBLICATIONS

Shao et al., "Object-Based Building Boundary Extraction from Lidar Data," Free and Open Source Software for Geospatial Conference Proceedings, vol. 15, Sep. 2015, pp. 91-96.

* cited by examiner

*Primary Examiner* — Tahmina N Ansari
(74) *Attorney, Agent, or Firm* — Christopher G. Darrow; Darrow Mustafa PC

(57) ABSTRACT

Systems, methods, and other embodiments described herein relate to detecting reflection artifacts in a point cloud. In one embodiment, a method includes generating a first convex hull for defining an outline of a first cluster of points in a depth image and generating a second convex hull for defining an outline of a second cluster of points in the depth image. The first cluster of points originates from a point cloud and the second cluster of points originates from the point cloud. The method includes determining whether the second cluster of points is a reflection artifact based on identifying if a portion of the second convex hull is enclosed in the first convex hull and a range of the second convex hull is larger than a range of the first convex hull.

20 Claims, 8 Drawing Sheets

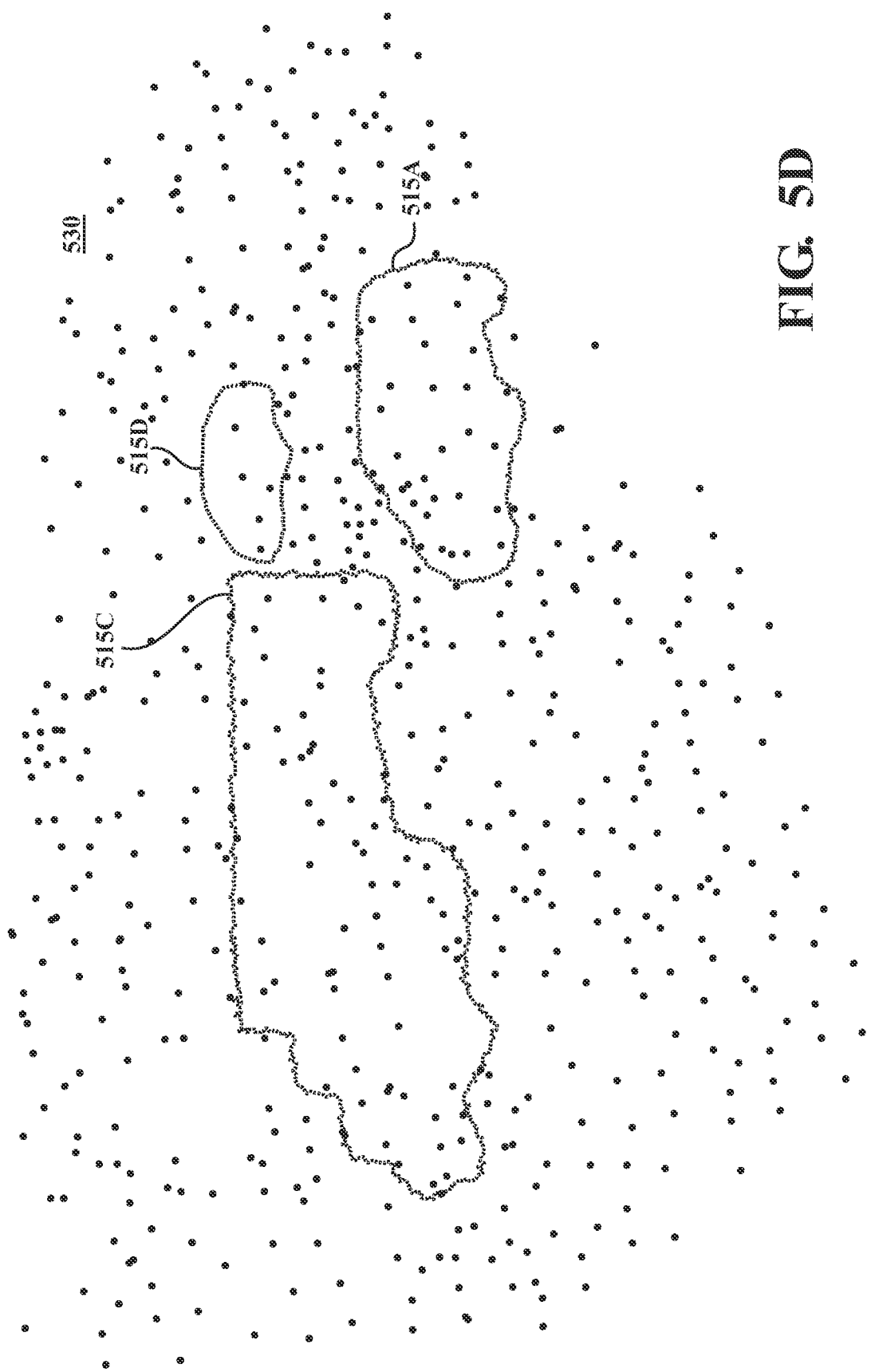

SYSTEMS AND METHODS FOR DETECTING A REFLECTION ARTIFACT IN A POINT CLOUD

TECHNICAL FIELD

The subject matter described herein relates in general to systems and methods for detecting reflection artifacts in a point cloud.

BACKGROUND

Perceiving an environment is an important aspect for many automated vehicle assistance systems such as a vehicle tracking system and a vehicle planning system. Such vehicle assistance systems may rely on three-dimensional (3D) point clouds captured by light detection and ranging sensors including LiDAR sensors to perceive the environment surrounding a vehicle.

However, captured 3D point clouds are often affected by highly reflective objects, including specular opaque and transparent materials, such as glass, mirrors, and polished metal. As such, captured 3D point clouds may include reflection artifacts that degrade the performance of associated computer vision techniques. In traditional noise filtering methods for point clouds, noise can be detected by assessing the distribution of the neighboring points. However, noise generated by reflected areas is quite dense and cannot be removed based on the point distribution.

SUMMARY

In one embodiment, a system for detecting reflection artifacts in a point cloud is disclosed. The system includes a processor and a memory in communication with the processor. The memory stores a convex hull generation module including instructions that when executed by the processor cause the processor to generate a first convex hull for defining an outline of a first cluster of points in a depth image and to generate a second convex hull for defining an outline of a second cluster of points in the depth image. The first cluster of points originates from a point cloud. The second cluster of points originates from the point cloud. The memory stores a reflection processing module including instructions that when executed by the processor cause the processor to determine whether the second cluster of points is a reflection artifact based on identifying if a portion of the second convex hull is enclosed in the first convex hull and a range of the second convex hull is larger than a range of the first convex hull.

In another embodiment, a method for detecting reflection artifacts in a point cloud is disclosed. The method includes generating a first convex hull for defining an outline of a first cluster of points in a depth image and generating a second convex hull for defining an outline of a second cluster of points in the depth image. The first cluster of points originates from a point cloud. The second cluster of points originates from the point cloud. The method includes determining whether the second cluster of points is a reflection artifact based on identifying if a portion of the second convex hull is enclosed in the first convex hull and a range of the second convex hull is larger than a range of the first convex hull.

In another embodiment, a non-transitory computer-readable medium for detecting reflection artifacts in a point cloud and including instructions that when executed by a processor cause the processor to perform one or more functions, is disclosed. The instructions include instructions to generate a first convex hull for defining an outline of a first cluster of points in a depth image and to generate a second convex hull for defining an outline of a second cluster of points in the depth image. The first cluster of points originates from a point cloud. The second cluster of points originates from the point cloud. The instructions include instructions to determine whether the second cluster of points is a reflection artifact based on identifying if a portion of the second convex hull is enclosed in the first convex hull and a range of the second convex hull is larger than a range of the first convex hull.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

FIGS. 5A-5D illustrates an example method of the reflection processing scenario shown in FIG. 4.

DETAILED DESCRIPTION

Figure 1:
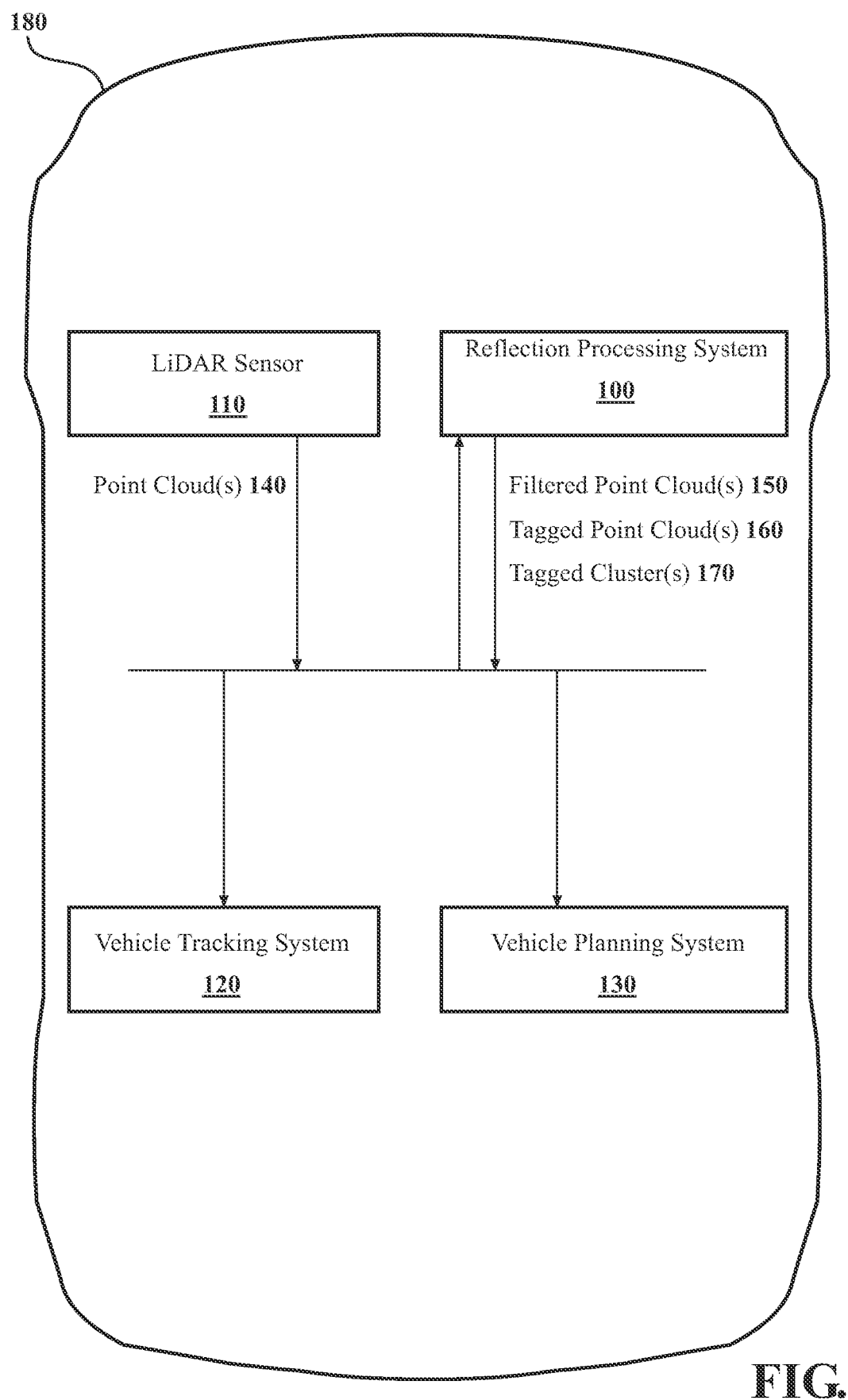
FIG. 1 illustrates one embodiment of a vehicle within which systems and methods disclosed herein may be implemented.

Several current vehicle systems rely on sensors such as LiDAR sensors to perceive the environment around a vehicle. Such vehicle systems make driving decisions based on 3D point clouds received from the LiDAR sensors. A vehicle system may use a 3D point cloud to perceive surrounding objects such as pedestrians, buildings, and other vehicles. As an example, using information from the 3D point cloud, a vehicle tracking system can estimate vehicle motion states and provide reliable data for the decision-making and planning of the vehicle. As another example, a vehicle system like a vehicle planning system may create a driving plan based on the objects perceived or detected in the environment surrounding the vehicle based on the 3D point cloud.

However, 3D point clouds may include noise caused by light reflected by highly reflective surfaces such as glass, mirrors, and polished metal. As an example, glass buildings, mirrored buildings, and large trucks with polished metal sides can cause light to bounce away from the LiDAR sensor, injecting noise in the form of reflection artifacts into the 3D point cloud. An object detection mechanism may erroneously detect and identify the reflection artifact as an object in the environment.

As previously mentioned, noise generated by highly reflective surfaces can be quite dense. It is difficult to distinguish reflection artifacts from valid points in the 3D point cloud using current methods.

Current methods to address this issue have included comparing the distances from neighboring points to the LiDAR sensor. In the case that one point in the neighboring points is farther away from the LiDAR sensor than the other points, the point is identified as an outlier and filtered out of the 3D point cloud. However, the method is ineffective when there is more than one false point, or more specifically, a cluster of false points to be detected as the method relies on the assumption that a majority of the neighboring points are true points. Another method includes utilizing multiple LiDAR sensors to provide 3D point clouds from varying perspectives and comparing the 3D point clouds to identify inconsistences between the 3D point clouds that may indicate a reflection artifact. However, the method requires multiple LiDAR sensors, and additional hardware and/or software to receive and compare the multiple 3D point clouds.

Accordingly, systems, methods, and other embodiments associated with detecting reflection artifacts in a point cloud are disclosed. In one embodiment, the disclosed approach is a system that detects and/or filters out reflection artifacts in a point cloud. The system is capable of identifying a reflection artifact that is a single point and a reflection artifact that is a cluster of points. The system includes identifying objects in the point cloud and determining that the points associated with the detected objects are true points. The system then compares the points of the identified objects to the single point or the cluster of points overlapping the detected objects to determine if the single point or the cluster of points are reflection artifacts(s). The system is also capable of using a single 3D point cloud or multiple 3D point clouds (from one or more LiDAR sensors) to identify the reflection artifact(s).

The embodiments disclose herein present various advantages over conventional technologies that detect reflection artifacts in a point cloud. First, the embodiments can provide a more accurate detection of reflection artifacts. Second, the embodiments can detect reflection artifacts of varying sizes, from a reflection artifact that is one point to a reflection artifact that is a cluster of points. The embodiments can detect a reflection artifact using a single LiDAR sensor.

The system may receive a point cloud from a LiDAR sensor such as a Velodyne Lidar that is mounted on a vehicle or located in a roadside unit. The system may utilize any suitable process or algorithm to detect objects in the point cloud. The system may then generate boundaries around the detected objects and remove the points associated with the detected objects from the point cloud. The system then creates clusters of points from the points remaining in the point cloud. The system converts the point cloud that presently has outlines of the detected objects and clusters of points to a depth image. In the depth image, the system generates first convex hulls based on the outlines of the detected objects and second convex hulls based on the clusters of points. Further, in the depth image, the system compares the positioning of the area within the first convex hulls and the positioning of the area within the second convex hulls.

If the system determines that a portion of one of the second convex hulls is enclosed in one of the first convex hulls, the system further determines how large the portion is. In the case where the system determines that, as an example, 95% of the area of the second convex hull is enclosed in the first convex hull, the system continues by determining the distance from the first convex hull to the LiDAR sensor and the distance from the second convex hull to the LiDAR sensor. In the case that the system determines that the distance from the second convex hull is larger than the distance from the first convex hull, the system makes the determination that the points associated with the second convex hull are related to a reflection artifact. The system can make this determination as the LiDAR sensor would not be capable of perceiving an object that is farther than the detected object associated with the first convex hull.

The system may filter the points related to the reflection artifact from the point cloud and output the filtered point cloud to a vehicle system such as the vehicle tracking system and/or the vehicle planning system. Alternatively, the system may tag the points associated with the reflection artifact and may output the tagging information to the vehicle system.

Referring to FIG. 1, one embodiment of a vehicle 180 that includes a reflection processing system 100 is illustrated. The vehicle 180 also includes a LiDAR sensor 110, a vehicle tracking system 120, and a vehicle planning system 130. The vehicle tracking system 120 may track objects such as pedestrians and other vehicles, in the environment surrounding the vehicle 180. In addition to tracking an object, the vehicle tracking system 120 may estimate and/or predict a position, a motion state and/or trajectory of the object in the environment. The vehicle planning system 130 plans the vehicle's 180 driving. The vehicle planning system 130 may plan the vehicle's 180 driving based on the information from the vehicle tracking system 120. As such, the vehicle planning system 130 may develop the vehicle's 180 driving plan based on the position, the motion state, and/or the trajectory of the object(s) in the environment.

The LiDAR sensor 110 outputs one or more point clouds 140 based on the environment. The reflection processing system 100 receives the point cloud(s) 140 from the LiDAR sensor 110. The reflection processing system 100 processes the point cloud(s) 140 to determine whether there are reflection artifacts in the point cloud(s) 140. In one embodiment, upon determining that there is a reflection artifact in the point cloud(s) 140, the reflection processing system 100 tags the points in the point cloud(s) 140 associated with the reflection artifact(s). The reflection processing system 100 may output information identifying the points associated with the reflection artifact in the point cloud 140 to the vehicle tracking system 120 and/or the vehicle planning system 130. The information, as previously mentioned, may be a tag. As an example, the tag may be included in metadata associated with the points in the point cloud 140. The points may be tagged as individual points 160 or the points may be in clusters 170 and the clusters 170 may be tagged. The tagged points 160 or tagged clusters 170 may be stored as separate data. In such an example, the vehicle tracking system 120 and/or the vehicle planning system 130 may receive the point cloud 140 from the LiDAR sensor 110 and the tagged points 160 from the reflection processing system 100.

The vehicle tracking system 120 may track an object, estimate the position, the motion state, and/or the trajectory of the object based on at least the point cloud(s) 140 from the LiDAR sensor 110 and the tagged points 160. Similarly, the vehicle planning system 130 may develop the vehicle driving plan based on the point cloud(s) 140 from the LiDAR sensor 110 and the tagged points 160. In another embodiment, the reflection processing system 100 may filter out the points associated with the reflection artifact(s) from the point cloud(s) 140 and may output a filtered point cloud 150 free of determined reflection artifact(s) to the vehicle tracking system 120 and/or the vehicle planning system 130. In such a case, the vehicle tracking system 120 may track an object, estimate the position, the motion state, and/or the trajectory of the object based on at least the filtered point cloud(s) 150 that is free of determined reflection artifacts. Similarly, the vehicle planning system 130 may develop the vehicle driving plan based on the filtered point cloud(s) 150 that is free of determined reflection artifacts.

Figure 2:
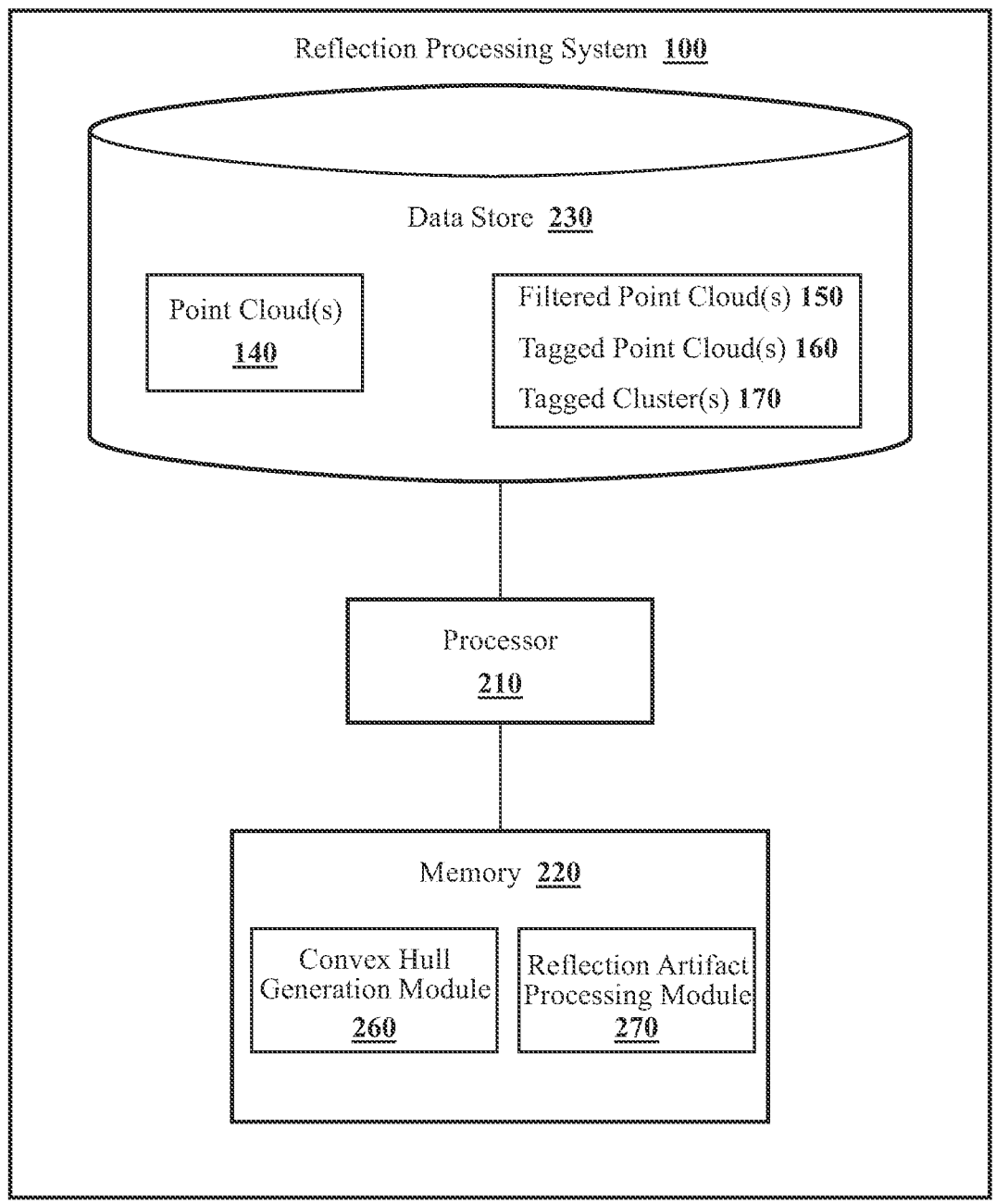
FIG. 2 illustrates one embodiment of the reflection processing system.

Referring to FIG. 2, one embodiment of a reflection processing system 100 is illustrated. As shown, the reflection processing system 100 includes a processor 210. Accordingly, the processor 210 may be a part of the reflection processing system 100, or the reflection processing system 100 may access the processor 210 through a data bus or another communication pathway. In one or more embodiments, the processor 210 is an application-specific integrated circuit that is configured to implement functions associated with a convex hull generation module 260 and a reflection artifact processing module 270. More generally, in one or more aspects, the processor 210 is an electronic processor such as a microprocessor that is capable of performing various functions as described herein when executing encoded functions associated with the reflection processing system 100.

In one embodiment, the reflection processing system 100 includes a memory 220 that can store the convex hull generation module 260 and the reflection artifact processing module 270. The memory 220 is a random-access memory (RAM), read-only memory (ROM), a hard disk drive, a flash memory, or other suitable memory for storing the convex hull generation module 260 and the reflection artifact processing module 270. The convex hull generation module 260 and reflection artifact processing module 270 are, for example, machine-readable and/or computer-readable instructions that, when executed by the processor 210, cause the processor 210 to perform the various functions disclosed herein. While, in one or more embodiments, the convex hull generation module 260 and the reflection artifact processing module 270 are instructions embodied in the memory 220, in further aspects, the convex hull generation module 260 and reflection artifact processing module 270 include hardware, such as processing components (e.g., controllers), circuits, etcetera for independently performing one or more of the noted functions.

Furthermore, in one embodiment, the reflection processing system 100 includes a data store 230. The data store 230 is, in one embodiment, an electronically-based data structure for storing information. In one approach, the data store 230 is a database that is stored in the memory 220 or another suitable storage medium, and that is configured with routines that can be executed by the processor 210 for analyzing stored data, providing stored data, organizing stored data, and so on. In any case, in one embodiment, the data store 230 stores data used by the convex hull generation module 260 and reflection artifact processing module 270 in executing various functions. In one embodiment, the data store 230 includes the point cloud(s) 140, the filtered point cloud(s) 150, the tagged point(s) 160, the tagged cluster(s), along with, for example, other information that is used by the convex hull generation module 260 and reflection artifact processing module 270.

In general, the point cloud 140 refers to a set of data points in space. The points may represent an object and/or a three-dimensional (3D) shape. As an example, the position of the points can be described using Cartesian coordinates (x, y, and z coordinates). The point cloud 140 can be generated by sensors such as the LiDAR sensor(s) 110, any suitable 3D scanner(s), and/or by photogrammetry software.

"Sensor" means any device, component and/or system that can detect, and/or sense something. The sensors can be configured to detect, and/or sense in real-time. As used herein, the term "real-time" means a level of processing responsiveness that a user or system senses as sufficiently immediate for a particular process or determination to be made, or that enables the processor to keep up with some external process. Various examples of different types of sensors will be described herein. However, it will be understood that the embodiments are not limited to the particular sensors described.

The filtered point cloud(s) 150 can be one or more point clouds in which the reflection processing system 100 has filtered out (i.e., removed) points that are associated with one or more reflection artifacts. As previously mentioned, the reflection processing system 100 may tag the points and/or clusters associated with the reflection artifacts such that the reflection processing system 100 may output tagged point(s) 160 and/or tagged cluster(s) 170.

The reflection processing system 100 can be operatively connected to the sensors. More specifically, the sensors can be operatively connected to the processor(s) 210, the data store(s) 230, and/or another element of the reflection processing system 100. In one embodiment, the sensors can be internal to the reflection processing system 100, external to the reflection processing system 100, or a combination thereof.

In one embodiment, the convex hull generation module 260 includes instructions that function to control the processor 210 to generate a first convex hull for defining an outline of a first cluster of points in a depth image. The first cluster of points originates from the point cloud 140. The convex hull generation module 260 includes instructions that function to control the processor 210 to generate a second convex hull for defining an outline of a second cluster of points in the depth image. The second cluster of points originates from the point cloud 140.

In one embodiment, the convex hull generation module 260 receives the point cloud 140 from the LiDAR sensor 110. The convex hull generation module 260 may group the points of the point cloud 140 into clusters based on a number of factors such as the proximity between two points and the range of the points. Additionally and/or alternatively, the convex hull generation module 260 may group the points of the point cloud 140 into multiple point clusters using any suitable and/or relevant factors. The multiple point clusters may include the first cluster of points and the second cluster of points. The convex hull generation module 260 may project the point cloud including the multiple point clusters into a depth image using any suitable algorithm, machine learning, and/or software process. The convex hull generation module 260 may generate convex hulls for the multiple point clusters. As such, the convex hull generation module 260 may generate the first convex hull(s) for the first cluster(s) of points and may generate the second convex hull(s) for the second cluster(s) of points. The convex hull generation module may generate the first and second convex hulls using any suitable algorithm such as gift wrapping, Graham scan, Quickhull, divide and conquer, monotone chain, incremental convex hull algorithm, Kirkpatrick-Seidel algorithm, and Chan's algorithm.

Additionally and/or alternatively, the convex hull generation module 260 may include instructions that function to control the processor 210 to detect an object based on the first cluster of points in the point cloud 140, generate an outline of the object, and project the outline of the object onto the depth image. The instructions to generate the first convex hull may further include instructions to generate the first convex hull based on the outline of the object.

The convex hull generation module 260 may include instructions that function to control the processor 210 to detect objects within the point cloud 140, remove points associated with the objects from the point cloud 140 such that the point cloud 140 is free of the points associated with the objects, and cluster points in the point cloud 140 that is free of the points associated with the objects into the second cluster(s) of points.

As an example, the convex hull generation module 260 may detect objects based on the first cluster of points in the point cloud 140 using any suitable process such as VeloFCN, 3DOP, 3D YOLO, PointNet, PointNet++, and VoxelNet. Upon detecting the object(s) in the point cloud 140, the convex hull generation module 260 may generate an outline of the detected object(s) within the point cloud 140 relative to the position of the detected object(s) in the point cloud 140. The convex hull generation module 260 may then identify the first cluster(s) of points in the point cloud 140 associated with the detected object(s) and remove the identified first cluster(s) of points from the point cloud 140 such that the point cloud 140 is free of the first cluster(s) of points associated with the objects.

The convex hull generation module 260 may then group the remaining points of the point cloud 140 into multiple point clusters, or more specifically, the second cluster(s) of points, using any suitable and/or relevant factors. As such, the resulting point cloud may include outlines of detected objects based on the first cluster of points and the multiple point clusters that include the second clusters of points. The convex hull generation module 260 may project the resulting point cloud that includes the outlines of detected objects and the second cluster of points into a depth image using any suitable algorithm, machine learning, and/or software process.

The convex hull generation module 260 may generate convex hulls based on the resulting point cloud. As such, the convex hull generation module 260 may generate the first convex hull(s) for the detected objects based on the outlines of the detected object and may generate the second convex hull(s) for the second cluster(s) of points based on the second cluster(s) of points. The convex hull generation module may output the depth image that has the multiple convex hulls including the first and second convex hulls to the reflection artifact processing module 270.

The reflection artifact processing module 270 includes instructions that function to control the processor 210 to determine whether the second cluster of points is a reflection artifact based on identifying if a portion of the second convex hull is enclosed in the first convex hull and a range of the second convex hull is larger than a range of the first convex hull. The reflection artifact processing module 270 may further include instructions that function to control the processor 210 to, in response to determining that the second cluster of points is a reflection artifact, tag the second cluster of points and output the tagged second cluster of points to the vehicle tracking system 120 and/or the vehicle planning system 130. The reflection artifact processing module 270 receives the depth image that has the multiple convex hulls including the first and second convex hulls.

The reflection artifact processing module 270 may include instructions that function to control the processor 210 to receive the multiple point clusters that includes the first cluster(s) of points and the second cluster(s) of points. In another example, the reflection artifact processing module 270 may receive the outlines of the detected objects and the second cluster(s) of points. The reflection artifact processing module 270 compares the positions of the convex hulls to determine if a portion of one convex hull is enclosed in another convex hull. In other words, the reflection artifact processing module 270 may compare the position of the second convex hull to the position of the first convex hull. In the case that the reflection artifact processing module 270 determines that a portion of the second convex hull is enclosed in the first convex hull, the reflection artifact processing module 270 further determines what portion of the second convex hull is enclosed by the first convex hull. As an example, the reflection artifact processing module 270 may calculate the area of the second convex hull and further calculate the area of the second convex hull enclosed (or overlapping) the first convex hull. The reflection artifact processing module 270 may determine the ratio or a percentage between the area of the second convex hull enclosed the first convex hull and the area of the whole second convex hull. In the case that the reflection artifact processing module 270 determines the ratio to be below or equal to the predetermined threshold, the reflection artifact processing module 270 would not pursue further analysis.

In the case that the reflection artifact processing module 270 determines the ratio to be above a predetermined threshold (e.g., 95% of the area of the second convex hull is enclosed in the area of the first convex hull), the reflection artifact processing module 270 may further compare the range (i.e., the distance) of the first convex hull from the LiDAR sensor 110 and the range (i.e., the distance) of the second convex hull from the LiDAR sensor 110. The reflection artifact processing module 270 may compare the range of the first convex hull and the second convex hull using any suitable process. As an example, the reflection artifact processing module 270 may compare the ranges of the points along boundaries of the first and second convex hulls. As another example, the reflection artifact processing module 270 may compare the ranges of a sampling of points enclosed in the first and second convex hulls. As yet another example, the reflection artifact processing module 270 may compare the average ranges of the points associated with the first and second convex hulls. As another example, the reflection artifact processing module 270 may compare center points of the first and second convex hulls.

If the reflection artifact processing module 270 determines that the range of the second convex hull is larger than the range of the first convex hull, the reflection artifact processing module 270 determines that the points and/or the cluster of points associated with the second convex hull are a reflection artifact and the reflection artifact processing module 270 may identify the points and/or the cluster of points associated with the second convex hull in any suitable manner. As an example, the reflection artifact processing module 270 may tag (or mark) the points associated with the second convex hull. As another example, the reflection artifact processing module 270 may develop metadata for the points associated with the second convex hull.

The reflection artifact processing module 270 may output the tags, the tagged points 160, the tagged clusters of points 170, and/or the metadata associated with the points to the vehicle tracking system 120 and/or the vehicle planning system 130.

As previously mentioned, the reflection artifact processing module 270 may include instructions that function to control the processor 210 to receive the multiple point clusters that include the first cluster(s) of points and the second cluster(s) of points. The reflection artifact processing module 270 may further include instructions that function to control the processor 210 to, in response to determining that the second cluster of points is a reflection artifact, filter out the second cluster of points from the multiple point clusters such that the multiple point clusters are free of the determined reflection artifact(s). The reflection artifact processing module 270 may further include instructions that function to control the processor 210 to output the multiple point clusters that are free of the determined reflection artifact(s) to the vehicle tracking system 120 and/or the vehicle planning system 130.

As an example, upon the reflection artifact processing module 270 determining that the range of the second convex hull is larger than the range of the first convex hull and identifying the points and/or the cluster of points associated with the second convex hull, the reflection artifact processing module 270 may filter (or remove) the points associated with the second convex hull from the multiple point clusters. As another example, the reflection artifact processing module 270 may identify the points associated with second convex hull and filter (or remove) the points from the point cloud, creating the filtered point cloud 150. The reflection artifact processing module 270 may output the filtered point cloud 150 to the vehicle tracking system 120 and/or the vehicle planning system 130.

Figure 3:
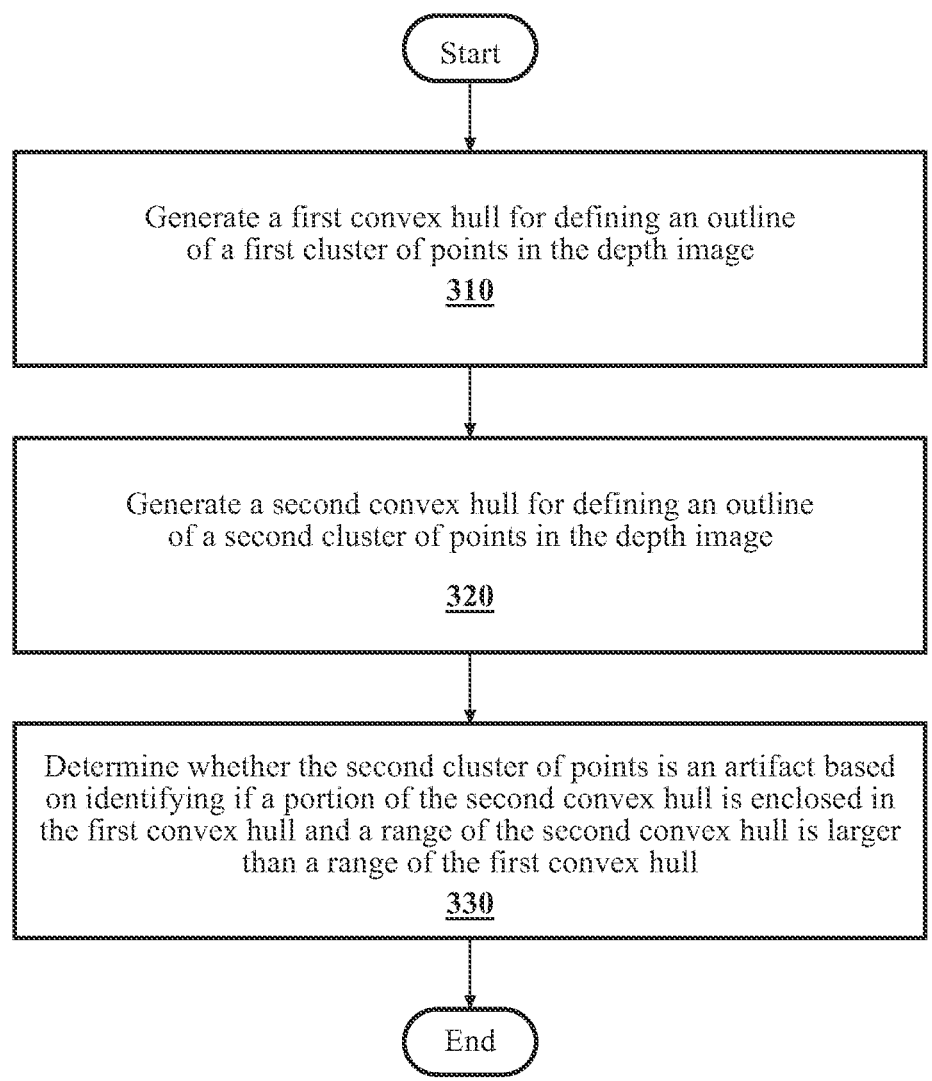
FIG. 3 illustrates a method for detecting reflection artifacts in a point cloud.

FIG. 3 illustrates a method 300 for detecting reflection artifacts in the point cloud 140. The method 300 will be described from the viewpoint of the reflection processing system 100 of FIGS. 1 and 2. However, the method 300 may be adapted to be executed in any one of several different situations and not necessarily by the reflection processing system 100 of FIGS. 1 and 2.

At step 310, the convex hull generation module 260 may cause the processor 210 to generate first convex hulls for defining the outlines of the first clusters of points in a depth image. The first clusters of points originate from the point cloud 140. As previously mentioned, the convex hull generation module 260 may receive the point cloud 140 from the LiDAR sensor 110. The convex hull generation module 260 may generate the first clusters of points from the point cloud 140 based on any suitable process or algorithm, and project the point cloud 140 including the first clusters of points to the depth image.

Additionally and/or alternatively, the convex hull generation module 260 may detect first objects associated with the first clusters of points within the point cloud 140. As an example, the convex hull generation module 260 may create outlines (or boundaries) of the first objects within the point cloud 140 and project the point cloud 140 including the outlines of the first objects to the depth image. Further, the convex hull generation module 260 may remove the points associated with the first objects from the point cloud 140 and may project the point cloud that includes the outlines of the first objects and excludes the points associated with the first objects to the depth image. The convex hull generation module 260 generates the first convex hulls associated with the outlines of the first objects and/or the first clusters of points in the depth image.

At step 320, the convex hull generation module 260 may cause the processor 210 to generate second convex hulls for defining outlines of second clusters of points in the depth image. The second clusters of points originate from the point cloud 140. The convex hull generation module 260 may generate the second clusters of points from the point cloud 140 based on any suitable process or algorithm, and project the point cloud 140 including the second clusters of points to the depth image.

Additionally and/or alternatively, the convex hull generation module 260 may detect second objects associated with the second clusters of points within the point cloud 140. As an example, the convex hull generation module 260 may create outlines (or boundaries) of the second objects within the point cloud 140 and project the point cloud 140 including the outlines of the second objects to the depth image. Further, the convex hull generation module 260 may remove the points associated with the second objects from the point cloud 140 and may project the point cloud 140 that includes the outlines of the second objects and excludes the points associated with the second objects to the depth image. The convex hull generation module 260 generates the second convex hulls associated with the outline of the second objects and/or in the second cluster of points the depth image.

At step 330, the reflection artifact processing module 270 may cause the processor 210 to determine whether the second clusters of points are reflection artifacts based on identifying if portions of any of the second convex hulls are enclosed in any of the first convex hulls and the range of the second convex hulls that have a portion enclosed is larger than the range of the first convex hull that the portion of the second convex hull is enclosed in.

Upon determining that the second cluster of points is a reflection artifact, the reflection artifact processing module 270 may tag, mark, or filter out the points associated with the second cluster of points. As previously mentioned, the reflection artifact processing module 270 may output the tag, the tagged points 160, the tagged clusters 170, the metadata associated with the second cluster of points that is a reflection artifact, or the filtered point cloud 150 free of the second cluster of points that is a reflection artifact to the vehicle tracking system 120 and/or the vehicle planning system 130.

A non-limiting example of the operation of the reflection processing system 100 and/or one or more of the methods will now be described in relation to FIGS. 4 and 5A-5D.

Figure 4:
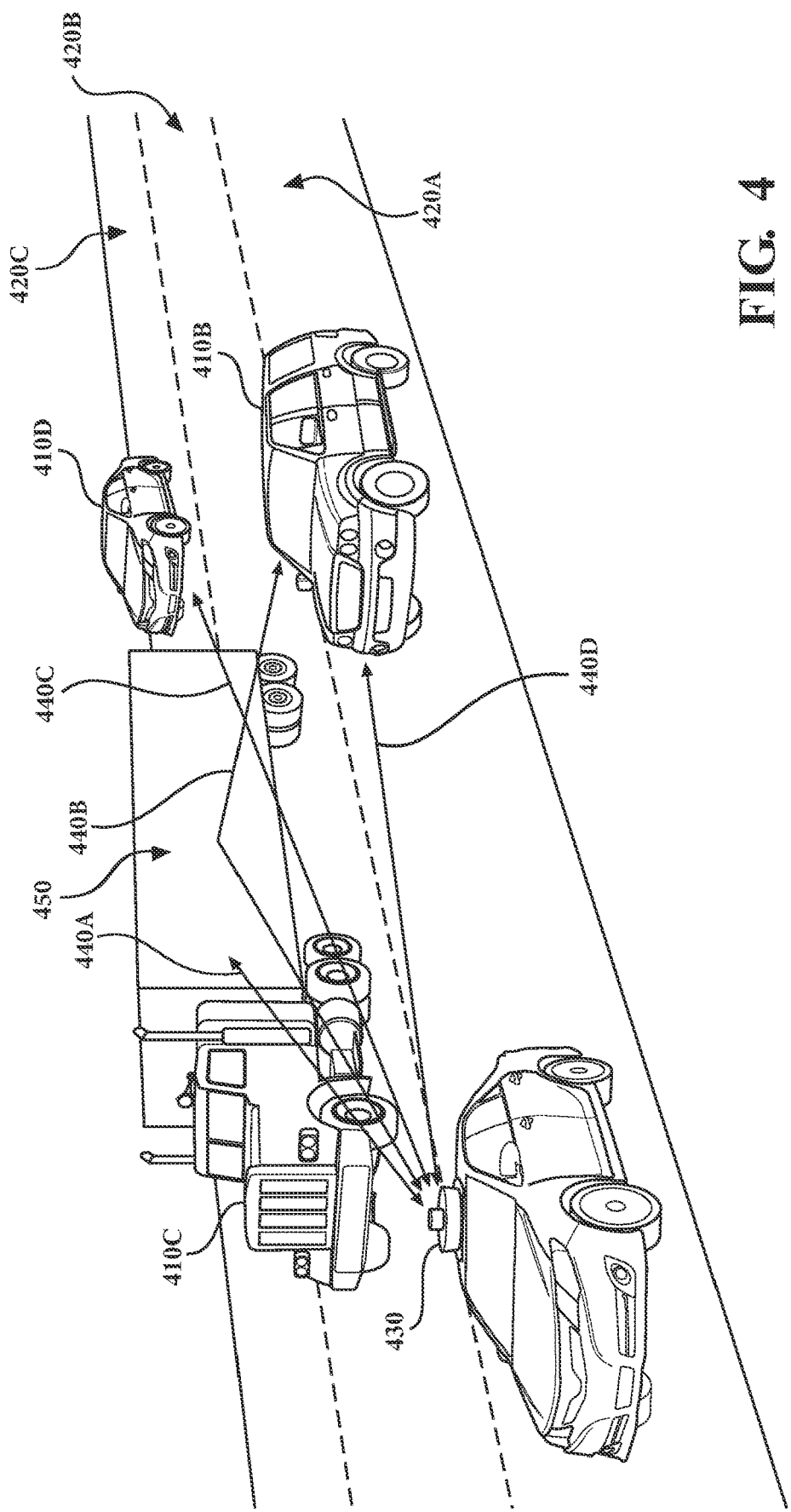
FIG. 4 illustrates an example of a reflection processing scenario.

FIG. 4 shows an example of a reflection processing scenario. FIG. 4 shows a first vehicle 410A and a second vehicle 410B travelling in a first lane 420A, a third vehicle 410C that has a reflective surface 450 travelling in a second lane 420B, and a fourth vehicle 410D travelling in a third lane 420C. A LiDAR sensor 430 is located on top of the first vehicle 410A. The LiDAR sensor 430 emits light beams 440A, 440B, 440C, 440D. The first light beam 440A hits the third vehicle 410C and then returns to the LiDAR sensor 430. The second light beam 440B hits the third vehicle 410C and bounces off the reflective surface 450 before returning to the LiDAR sensor 430. The third and fourth light beams 440C, 440D hit the fourth vehicle 410D and the second vehicle respectively and then, return to the LiDAR sensor 430.

In FIGS. 5A-5D, the reflection processing system 100 receives a point cloud 500 from the LiDAR sensor 430. More specifically, the convex hull generation module 260 receives the point cloud 500 from the LiDAR sensor 430.

Figure 5B:
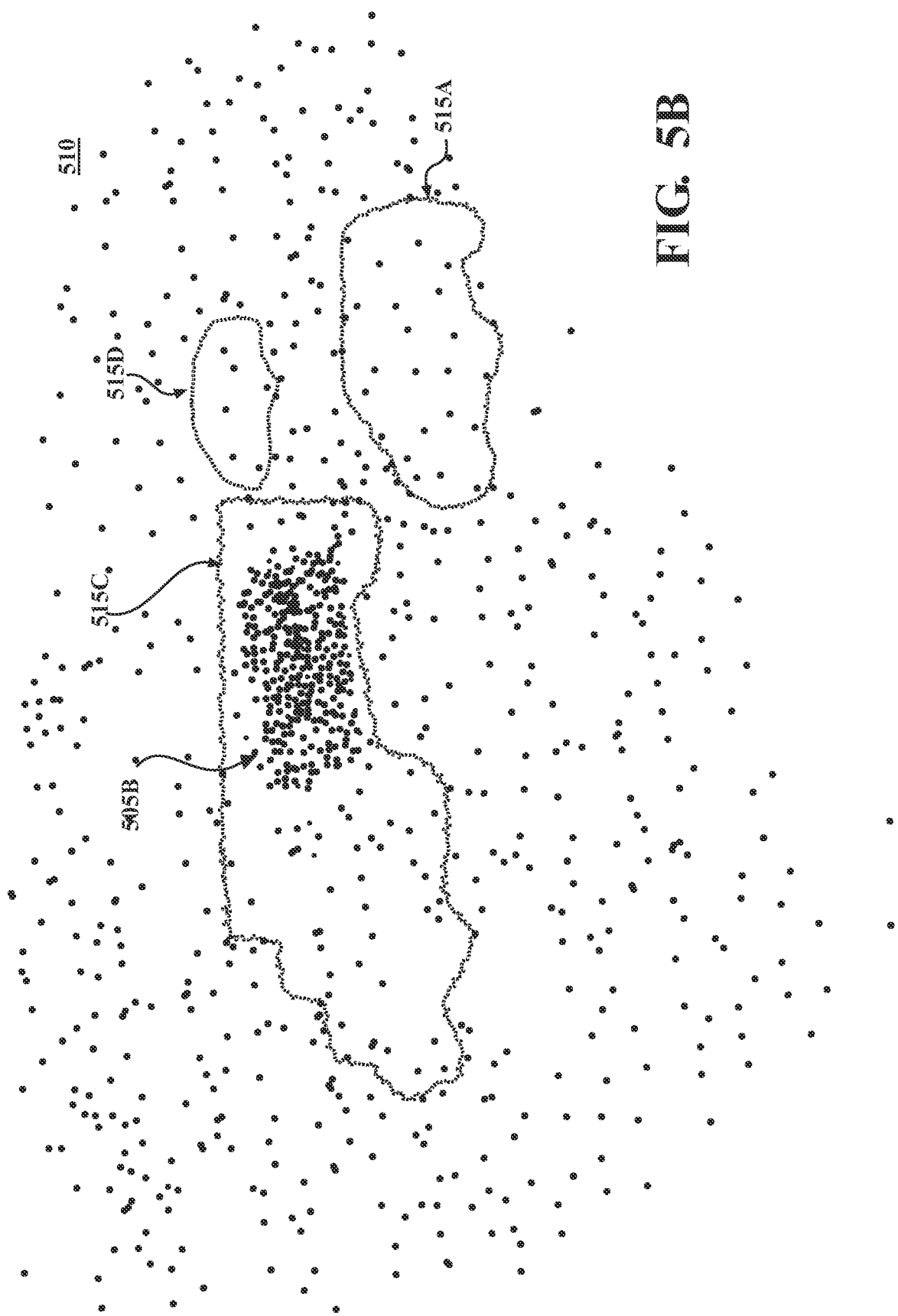
Figure 5C:
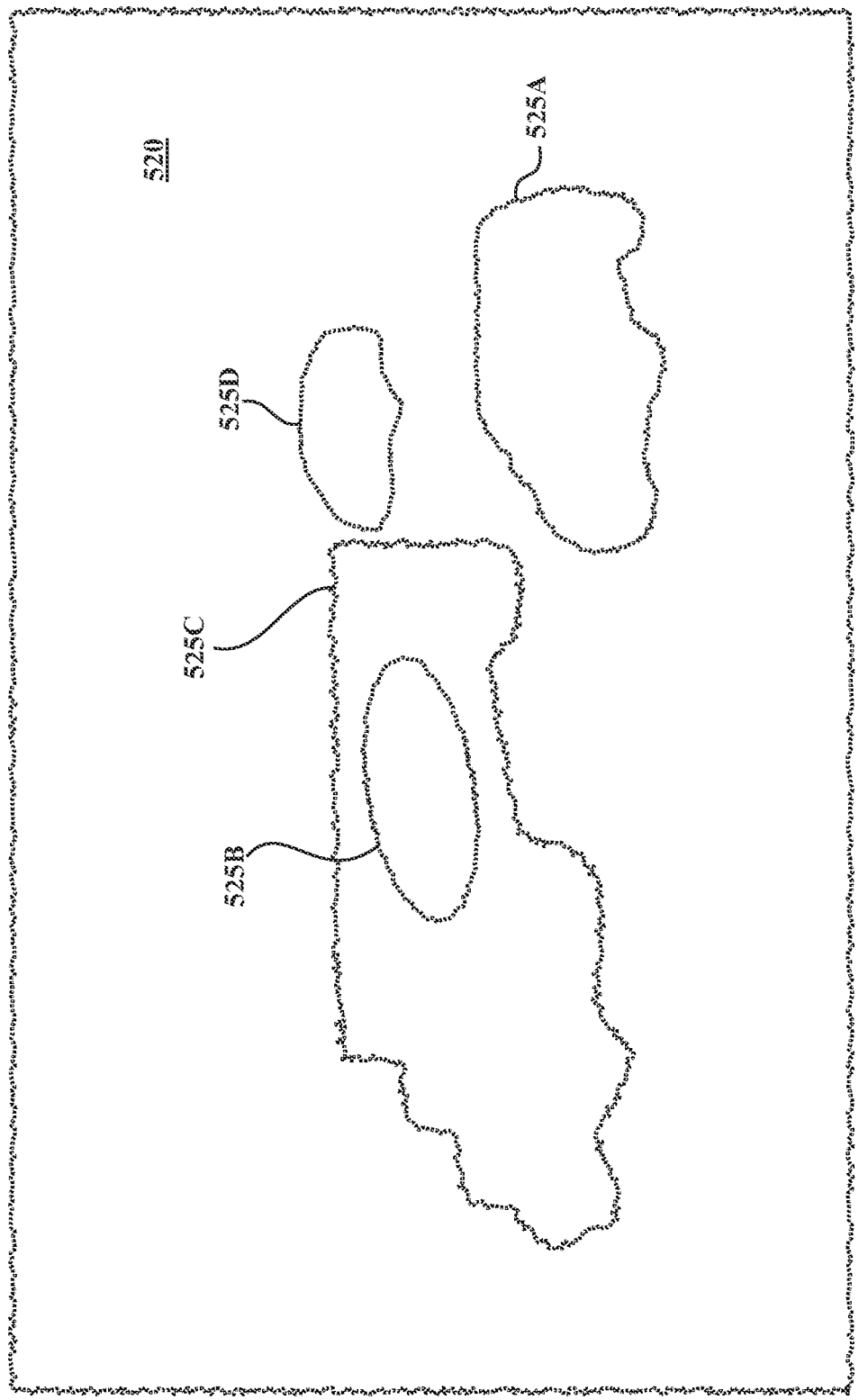

FIG. 5A shows a top view of the point cloud 500. The point cloud 500 includes a cluster of points 505A associated with the second vehicle 410B, a cluster of points 505B associated with the reflection of the second vehicle 410B, a cluster of points 505C associated with the third vehicle 410C, and a cluster of points 505D associated with the fourth vehicle 410D. FIG. 5B shows a point cloud 510 from the perspective of the LiDAR sensor 430. The point cloud 510 includes outlines 515A, 515C, 515D associated with vehicles 410B, 410C, 410D. FIG. 5C shows a depth image 520 with first convex hulls 525A, 525C, 525D and a second convex hull 525B. The depth image 520 is from the LiDAR sensor 430 perspective. FIG. 5D shows a point cloud 530 with the cluster of points associated with a reflection artifact filtered out.

The reflection processing system 100, or more specifically the convex hull generation module 260, detects the vehicles 410B, 410C, 410D in the point cloud 500 based on the first clusters of points 505A, 505C, 505D. As shown in FIG. 5B, the convex hull generation module 260 then generates the outlines 515A, 515C, 515D for the detected vehicles 410B, 410C, 410D and removes the points associated with the detected vehicles 410B, 410C, 410D from the point cloud 510. The convex hull generation module 260 clusters together the remaining points, including the second cluster of points 505B. The convex hull generation module 260 projects the point cloud 510 including the outlines 515A, 515C, 515D and the second cluster of points 505B to the depth image 520. The convex hull generation module 260 then generates the first convex hulls 525A, 525C, 525D associated with the outlines 515A, 515C, 515D and the second convex hull 525B associated with the second cluster of points 505B.

FIG. 5C shows the depth image 520 with the first convex hull 525A associated with the second vehicle 410B having the lowest range and being the closest vehicle to the LiDAR sensor 430 and the first vehicle 410A, the first convex hull 525C having the second lowest range and being the second closest to the LiDAR sensor 430 and the first vehicle 410A, and the first convex hull 525D having the third lowest range and being the third closest to the LiDAR sensor 430 and the first vehicle 410A. FIG. 5C further shows the second convex hull 525B having the highest range and being the farthest away from the LiDAR sensor 430 and first vehicle 410A.

As shown in FIG. 5C, the reflection processing system 100, or more specifically the reflection artifact processing module 270, identifies that the whole of the second convex hull 525B is enclosed in the first convex hull 525C and the range of the second convex hull 525B is larger than the range of the first convex hull 525C, indicating that second cluster of points 505B associated with the second convex hull 525B is a reflection artifact. The reflection artifact processing module 270 filters out the second cluster of points 505B associated with the reflection artifact from the point cloud 510 in FIG. 5B, resulting in the point cloud 530, as shown in FIG. 5D. The reflection artifact processing module 270 may output the filtered point cloud 530 to the vehicle tracking system 120 and/or the vehicle planning system 130.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor 210, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
    a processor; and
    a memory storing machine-readable instructions that, when executed by the processor, cause the processor to:
        generate a first convex hull for defining an outline of a first cluster of points in a depth image, the first cluster of points originating from a point cloud;
        generate a second convex hull for defining an outline of a second cluster of points in the depth image, the second cluster of points originating from the point cloud; and
        determine whether the second cluster of points is a reflection artifact based on identifying if a portion of the second convex hull is enclosed in the first convex hull and a range of the second convex hull is larger than a range of the first convex hull.

2. The system of claim 1, wherein the machine-readable instructions further include instructions that when executed by the processor cause the processor to:
    in response to determining that the second cluster of points is a reflection artifact, tag the second cluster of points.

3. The system of claim 2, wherein the machine-readable instructions further include instructions that when executed by the processor cause the processor to:
    output the tagged second cluster of points to at least one of a vehicle tracking system or a vehicle planning system.

4. The system of claim 1, wherein the machine-readable instructions further include instructions that when executed by the processor cause the processor to:
    receive a plurality of point clusters, wherein the plurality of point clusters includes the first cluster of points and the second cluster of points; and
    in response to determining that the second cluster of points is a reflection artifact, filter out the second cluster of points from the plurality of point clusters such that the plurality of point clusters is free of one or more determined reflection artifacts.

5. The system of claim 4, wherein the machine-readable instructions further include instructions that when executed by the processor cause the processor to:
    output the plurality of point clusters that is free of the one or more determined reflection artifacts to at least one of a vehicle tracking system or a vehicle planning system.

6. The system of claim 1, wherein the machine-readable instructions further include instructions that when executed by the processor cause the processor to:
    detect an object based on the first cluster of points in the point cloud;
    generate an outline of the object; and
    project the outline of the object onto the depth image;

wherein the instructions to generate the first convex hull further include instructions to generate the first convex hull based on the outline of the object.

7. The system of claim 1, wherein the machine-readable instructions further include instructions that when executed by the processor cause the processor to:
detect one or more objects within the point cloud;
remove points associated with the one or more objects from the point cloud such that the point cloud is free of the points associated with the one or more objects; and
cluster points in the point cloud that is free of the points associated with the one or more objects into one or more clusters of points, wherein the one or more clusters of points include the second cluster of points.

8. A method comprising:
generating a first convex hull for defining an outline of a first cluster of points in a depth image, the first cluster of points originating from a point cloud;
generating a second convex hull for defining an outline of a second cluster of points in the depth image, the second cluster of points originating from the point cloud; and
determining whether the second cluster of points is a reflection artifact based on identifying if a portion of the second convex hull is enclosed in the first convex hull and a range of the second convex hull is larger than a range of the first convex hull.

9. The method of claim 8, further comprising:
in response to determining that the second cluster of points is a reflection artifact, tagging the second cluster of points.

10. The method of claim 9, further comprising:
outputting the tagged second cluster of points to at least one of a vehicle tracking system or a vehicle planning system.

11. The method of claim 8, further comprising:
receiving a plurality of point clusters, wherein the plurality of point clusters includes the first cluster of points and the second cluster of points; and
in response to determining that the second cluster of points is a reflection artifact, filtering out the second cluster of points from the plurality of point clusters such that the plurality of point clusters is free of one or more determined reflection artifacts.

12. The method of claim 11, further comprising:
outputting the plurality of point clusters that is free of the one or more determined reflection artifacts to at least one of a vehicle tracking system or a vehicle planning system.

13. The method of claim 8, further comprising:
detecting an object based on the first cluster of points in the point cloud;
generating an outline of the object; and
projecting the outline of the object onto the depth image;
wherein generating the first convex hull is based on the outline of the object.

14. The method of claim 8, further comprising:
detecting one or more objects within the point cloud;
removing points associated with the one or more objects from the point cloud such that the point cloud is free of the points associated with the one or more objects; and
clustering points in the point cloud that is free of the points associated with the one or more objects into one or more clusters of points, wherein the one or more clusters of points include the second cluster of points.

15. A non-transitory computer-readable medium including instructions that when executed by a processor cause the processor to:
generate a first convex hull for defining an outline of a first cluster of points in a depth image, the first cluster of points originating from a point cloud;
generate a second convex hull for defining an outline of a second cluster of points in the depth image, the second cluster of points originating from the point cloud; and
determine whether the second cluster of points is a reflection artifact based on identifying if a portion of the second convex hull is enclosed in the first convex hull and a range of the second convex hull is larger than a range of the first convex hull.

16. The non-transitory computer-readable medium of claim 15, wherein the instructions further include instructions to:
in response to determining that the second cluster of points is a reflection artifact, tag the second cluster of points.

17. The non-transitory computer-readable medium of claim 16, wherein the instructions further include instructions to:
output tagged second cluster of points to at least one of a vehicle tracking system or a vehicle planning system.

18. The non-transitory computer-readable medium of claim 15, wherein the instructions further include instructions to:
receive a plurality of point clusters, wherein the plurality of point clusters includes the first cluster of points and the second cluster of points; and
in response to determining that the second cluster of points is a reflection artifact, filter out the second cluster of points from the plurality of point clusters such that the plurality of point clusters is free of one or more determined reflection artifacts.

19. The non-transitory computer-readable medium of claim 18, wherein the instructions further include instructions to:
output the plurality of point clusters that is free of the one or more determined reflection artifacts to at least one of a vehicle tracking system or a vehicle planning system.

20. The non-transitory computer-readable medium of claim 15, wherein the instructions further include instructions to:
detect an object based on the first cluster of points in the point cloud;
generate an outline of the object; and
project the outline of the object onto the depth image;
wherein the instructions further include instructions to generate the first convex hull based on the outline of the object.

* * * * *